(12) United States Patent
Chen et al.

(10) Patent No.: US 7,072,045 B2
(45) Date of Patent: Jul. 4, 2006

(54) HIGH RESOLUTION OPTICAL COHERENCE TOMOGRAPHY WITH AN IMPROVED DEPTH RANGE USING AN AXICON LENS

(75) Inventors: Zhongping Chen, Irvine, CA (US); Zhihua Ding, Zhejiang (CN); J. Stuart Nelson, Laguna Niguel, CA (US)

(73) Assignee: The Regents of the University of California, Oakland, CA (US)

( * ) Notice: Subject to any disclaimer, the term of this patent is extended or adjusted under 35 U.S.C. 154(b) by 231 days.

(21) Appl. No.: 10/345,671

(22) Filed: Jan. 16, 2003

(65) Prior Publication Data

US 2003/0218756 A1 Nov. 27, 2003

Related U.S. Application Data

(60) Provisional application No. 60/349,938, filed on Jan. 18, 2002, and provisional application No. 60/349,086, filed on Jan. 16, 2002.

(51) Int. Cl.
*G01B 9/02* (2006.01)

(52) U.S. Cl. .................................... 356/479

(58) Field of Classification Search ................ 356/479, 356/497; 250/227.19, 227.27, 229.19, 229.27; 385/12
See application file for complete search history.

(56) References Cited

U.S. PATENT DOCUMENTS 6,256,102 B1 * 7/2001 Dogariu ...................... 356/479

* cited by examiner

*Primary Examiner*—Samuel A. Turner
(74) *Attorney, Agent, or Firm*—Daniel L. Dawes; Myers Dawes Andras & Sherman LLP

(57) ABSTRACT

In optical coherence tomography (OCT), Axial and lateral resolutions are determined by the source coherence length and numerical aperture of the sampling lens, respectively. While axial resolution can be improved using a broadband light source, there is a trade-off between lateral resolution and focusing depth when conventional optical elements are used. The incorporation of an axicon lens into the sample arm of the interferometer overcomes this limitation. Using an axicon lens with a top angle of 160 degrees, 10 μm or better-lateral resolution is maintained over a focusing depth of at least 6 mm. In addition to high lateral resolution, the focusing spot intensity is approximately constant over a greater depth range.

9 Claims, 8 Drawing Sheets

HIGH RESOLUTION OPTICAL COHERENCE TOMOGRAPHY WITH AN IMPROVED DEPTH RANGE USING AN AXICON LENS

RELATED APPLICATIONS

The present application is related to U.S. Provisional Patent Application Ser. No. 60/349,086, filed Jan. 16, 2002, and Ser. No. 60/349,938, filed Jan. 18, 2002, which are incorporated herein by reference and to which the present application claims priority pursuant to 35 USC 119.

GOVERNMENT RIGHTS

The invention was made with Government Support under Grant (Contract) No. HL84218, awarded by the NIH and Grant (Contract) No. F49620-00-1-0371 awarded by the AFOSR. The Government has certain rights in this invention.

BACKGROUND OF THE INVENTION

1. Field of the Invention

The invention relates to the field of optical coherence tomography, and in particular to an improved optical system in which optical coherence tomography is performed.

2. Description of the Prior Art

Three-dimensional high resolution optical imaging has potential clinical applications in the emerging field of biomedical optics. In a conventional optical imaging system, axial and lateral resolutions are correlated. Hence, one cannot obtain both in the same system. Optical coherence tomography (OCT) is a new modality that provides high resolution sub-surface microstructural images in a noninvasive manner. OCT uses coherence gating to select minimum backscattered photons for image reconstruction. Axial and lateral resolutions are determined by the source coherence length and numerical aperture of the sampling lens, respectively. While axial resolution can be improved using a broadband light source, there is a trade-off between lateral resolution and focusing depth when conventional optical elements are used, e.g. spherical lenses, mirrors, etc., because a beam with a long focal depth and narrow lateral width cannot be produced simultaneously. While high lateral resolution imaging requires a large numerical aperture, a long focal depth requires a small numerical aperture. In high speed OCT imaging, where an axial scanning mode (A-mode) is used, a tightly-focused lens produces a micrometer sized spot at only one particular depth. The coherence gate quickly moves out of the shallow depth of focus during the scan. Although dynamic focusing compensation can be used to overcome this limitation, current lenses can only be used at low speeds, which limit their use to low frame rate OCT systems. In addition, dynamic focusing lenses are bulky and cannot be implemented in circumstances where physical space is limited such as endoscopic OCT.

What is needed is some means or methodology whereby these limitations of the prior art can be overcome without creating a disadvantage in some other aspect of operation.

BRIEF SUMMARY OF THE INVENTION

The invention is an improvement in a scanning OCT system, which includes an interferometer with a sample arm for scanning a sample. The improvement comprises an axicon lens disposed in the sample arm to simultaneously achieve high lateral resolution and a greater depth of focus of the sample. The axicon lens in the sample arm is provided with spatially coherent light. In the illustrated embodiment the axicon lens comprises a single refracting cone lens, but it may assume any other form desired such as a ring lens or a cylindrical lens.

In the illustrated embodiment described below the axicon lens has a top angle of approximately 160 degrees with a lateral resolution of at least 10 μm over a focusing depth of at least 6 mm. However, if must be expressly understood that the top angle, lateral resolution and focusing depth may vary from the example given according to the teachings of the invention without departing from the spirit and scope of the invention.

More specifically, the invention is an improvement in an apparatus for phase-resolved optical tomography capable of simultaneously imaging fluid flow and morphology in a sample with fast scanning speed and high velocity sensitivity. The apparatus comprises an interferometer; a source of at least partially coherent radiation through coupled to the interferometer in which the at least partially coherent radiation is characterized by a phase; a phase modulator coupled to the source to modulate the radiation in the interferometer at a modulation frequency; and a scanner for scanning the sample with the source of at least partially coherent radiation through the interferometer in a sequence of pixel line scans. The sample has a fluid flow therein so that the phase of the partially coherent radiation is changed in response to the fluid flow at each pixel of each pixel line scan. A detector detects interference fringes of the radiation backscattered from the sample into the interferometer. A processor determines the corresponding phase at each pixel of the pixel line scans from the ODT phase signals of the detected backscattered interference fringes and compares the phase between corresponding pixels in two line scans to generate a difference between the phase at the two corresponding pixels in two line scans. A display generates a tomographic image of the fluid flow in the sample from the difference at each pixel. The improvement comprises an axicon lens disposed in the sample arm to simultaneously achieve high lateral resolution and a greater depth of focus of the sample.

While the improvement has been defined in the foregoing paragraph in a specific type of apparatus for phase-resolved optical tomography, it must be expressly understood that the OCT system in which the improvement is employed is not limited to the illustrated OCT system. For example the improvement may be used in any type of OCT system and not only those which are capable of simultaneously imaging fluid flow and morphology in sample with fast scanning speed and high velocity sensitivity.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 5A and 5A' correspond to OCT images obtained using an axicon lens. FIGS. 5B and 5B' correspond to OCT images obtained using a conventional lens focusing at the top of the tube. FIGS. 5C and 5C' correspond to OCT images obtained using a conventional lens focusing at the center of the tube.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
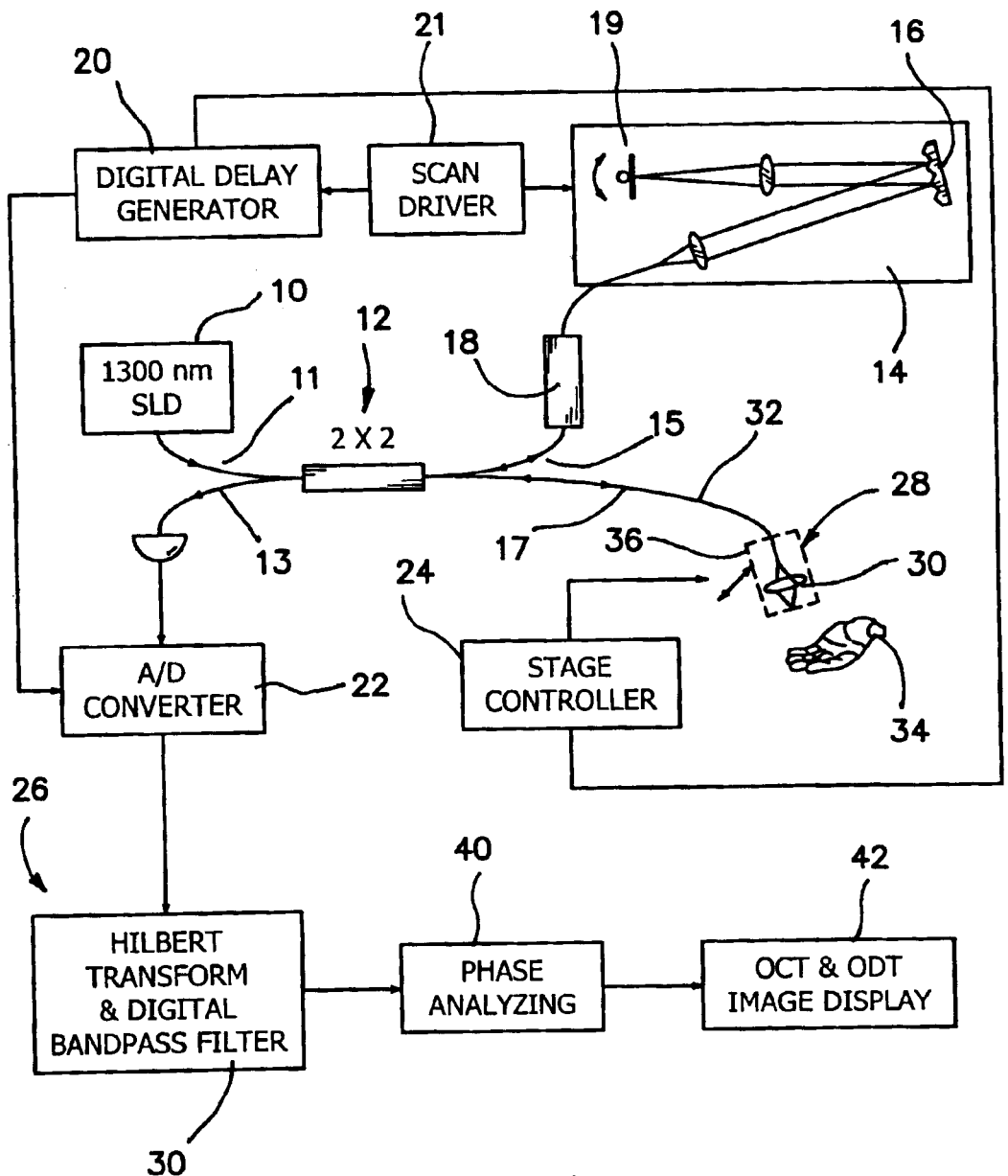
FIG. 1 is a schematic diagram of the optical device and signal processing interferometric system for OCT imaging. The system comprises a rapid scanning optical delay line (RSOD); a fiber-pigtailed electro-optic modulator (EOM); a superluminescent diode (SLD); and an analog-digital converter (A/D). The RSOD is conventional and is further described in G. J. Tearney et.al., "*High-Speed Phase-and Group-Delay Scanning with a Grating-Based Phase Control Delay Line*," Optics Letters, vol. 22, No. 23, pp 1811–1813 (1997). A probe is mounted upon a stage for lateral scanning.

The illustrated embodiment of the invention discloses an axicon lens incorporated into the sample arm of the OCT interferometer to simultaneously achieve both high lateral resolution and a greater depth of focus. The optical device is based on a phase resolved OCT/ODT system as briefly described in connection with FIG. 1. A detailed description can be found in U.S. patent application, entitled "Phase-Resolved Optical Coherence Tomography And Optical Doppler Tomography For Imaging Fluid Flow In Tissue With Fast Scanning Speed And High Velocity Sensitivity", Ser. No. 09/574,560, filed May 19, 2000, which is incorporated herein by reference.

A light source 10 for the interferometer, generally denoted by reference numeral 12, is a broadband 1.3 μm superluminescent diode from AFC, Inc. (Quebec, Canada). Interferometer 12 is comprised of a fiber optic source arm 11, fiber optic detector arm 13, fiber optic reference arm 15 and fiber optic sample arm 17. The arms of interferometer 12 could also be established in free space or other light conducting paths with appropriate modification. The polarized output power of diode 10 is 5 mW with a bandwidth of 65 nm. In the reference arm 15 of interferometer 12 a rapid-scanning optical delay line 14 is used that employs a grating 16 to control the phase and the group delays separately so that no phase modulation is generated when the group delay is scanned. RSOD 14 includes in addition to grating 16 focusing optics and a reference mirror 19 which is driven or oscillated by a scan driver 21 from Cambridge Technology (Massachusetts). The phase modulation is generated through an electro-optic phase modulator 18 that produces a stable carrier frequency. A digital delay generator 20 from Stanford Research Systems (Stanford, Calif.) is used to synchronize the electro-optic phase modulator 18, an analog-digital converter 22, and an A-scan controller 24. The digitized fringe signal is processed with a computer, generally denoted by reference numeral 26, to generate both structural and Doppler images from complex analytic continuation of the interference fringes. As will be discussed below computer 26 includes a Hilbert transform and digital bandpass filter module 38, a phase analyzing module 40 and an OCT and ODT image display module 42. Modules 38, 40, and 42 include a combination of software and hardware for performing the defined corresponding functions described above.

The optical probe 28 in the sampling arm is comprised of a gradient-index lens 30 (N.A., 0.2) that is placed so that light from the end of the fiber 17 is focused into the sample 34 with a beam size of approximately 10 μm. The probing beam is aligned at a small angle (5°–10°) with respect to the tissue surface normal so that blood flow parallel to the surface can produce a Doppler frequency shift. Mounting probe 28 upon a voice-coil translation stage 36 (PI, Inc., Waldbronn, Germany), diagrammatically represented in FIG. 1 by a dotted outline, generates a stepped lateral scan for tomographic imaging. At each step in the lateral scan, not less than three and preferably eight A-line scans are recorded at a speed of 400 Hz to increase the signal/noise ratio in the velocity image. The time for acquiring an image with 100×100 pixels is 2 s. The Doppler frequency shift is determined by calculation of the average phase shift between sequential A-line scans.

The axicon lens was first introduced by McLeod, J.Opt-.Soc.Am. 44,592 (1954) as a term to describe an optical element that produces a line image lying along a predetermined axis from a point source of light. An axicon is a conical prism in the shape of a right circular cone and known commercially as an axicon. There are many different kinds of axicon lenses, e.g. rings, cylinders, etc., but the single refracting cone lens is the most common form. Hence we refer an axicon lens specifically to a refracting conical lens in the context of the illustrated embodiment. Using an axicon lens with a top angle of 160 degrees, 10 μm lateral resolution or better is maintained over a focusing depth of at least 6 mm. In addition to high lateral resolution, the focusing spot intensity is approximately constant over a greater depth range.

However, it must be understood that the invention includes within its scope other ways now known or later devised of implementing the axicon lens than that specifically described above, such as using phase masked arrays, which provide substantially the same result and which are also thought of as a form of axicon lenses. Such arrays are well known and described in Vasara et al., "Realization Of General Nondiffracting Beams With Computer-Generated Holograms," J. Opt. Soc. Am. A/Vol. 6, No. 11/November 1989. The masked arrays are of particular utility in endoscopic applications, so that it must be expressly understood that the flatter masked array, acting as an axicon lens, is advantageously substituted for the more bulky optical or glass axicon lens described below in connection with FIGS. 6a–6d.

Figure 2:
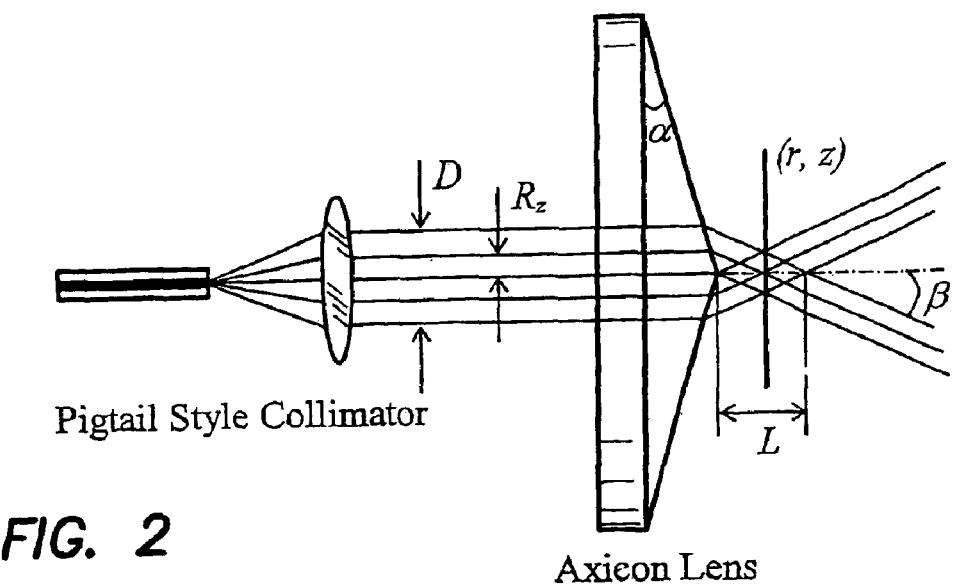
FIG. 2 is a diagrammatic view of an axicon lens in the sample arm of the OCT system used to simultaneously achieve both high lateral resolution and a greater depth of focus.

The high speed phase-resolved OCT system at 1.3 μm is used in the illustrated embodiment as described above in connection with FIG. 1. We incorporate an axicon lens 100 into the sample arm 17 of the interferometer. A schematic of the fused silica axicon lens (1 inch diameter, top angle of 160 degrees, AR coating 1050–1350 nm, edge thickness 3 mm and diffraction index of 1.44681 at wavelength of 1.3 μm is shown in FIG. 2. Light emitting from a single mode fiber 102 is collimated with a lens 104 to produce a spatially coherent illumination upon the axicon lens 100. Spatially coherent illumination is necessary for the axicon lens 100 to produce a coherent and sharply focused spot which is similar to a conventional lens. If spatially incoherent light illumination is used, the spot becomes wider and spatially incoherent resulting in reduced transverse resolution and low signal to noise ratio (SNR) in the OCT. The intensity distribution, I(r,z), behind the axicon lens 100 illuminated by a collimated beam of diameter D as shown in FIG. 2 is given by $$I(r, z) = E^2(R_z) R_z \frac{2\pi k \sin\beta}{\cos^2\beta} J_0^2(kr \sin\beta), \quad (1)$$

where $E^2(R_z)$ is the energy of the incident beam at radius $R_z$ contributing to the intensity at axial point z through the relationship as shown in FIG. 2, α is the angle formed by the conical surface with the flat surface of the axicon lens as shown in FIG. 2, and where β is the angle of the focused rays relative to the axis of lens 100 as shown in FIG. 2:

$$R_z = \frac{z \tan\beta}{1 - \tan\alpha \tan\beta} \quad (2)$$

where k is the wave number, $J_0$ is the zero-order Bessel function of the first kind, r is the radial coordinate on the observation plane, and L is the depth of focus as shown in FIG. 2 approximated by $$L = \frac{D(\tan^{-1}\beta - \tan\alpha)}{2} \quad (3)$$

where $$\beta = \sin^{-1}(n\sin\alpha) - \alpha$$

the intersection angle of geometrical rays with the optical axis is deduced from Snell's law and takes the form $$n \sin \alpha = \sin (\alpha + \beta) \quad (4)$$

where n is the refraction index of the axicon lens. According to Eq. 1, the central peak radius, $\rho_0$, of the beam behind the axicon lens can be predicted by the first zero of the Bessel function $$J_0(k \rho_0 \sin \beta) = 0 \quad (5)$$

which results in $$\rho_0 = \frac{2.4048 \lambda}{2\pi \sin\beta} \quad (6)$$

where λ is the wavelength of the light. Inserting the relevant parameters pertaining to the axicon lens (α=10 degrees, D=2 mm, λ=1.3 μm and n=1.44681) into Eqs. 3 and 6, the estimated depth of focus L is 12.4 mm and the central peak radius $\rho_0$ is 6.32 μm.

Figure 3:
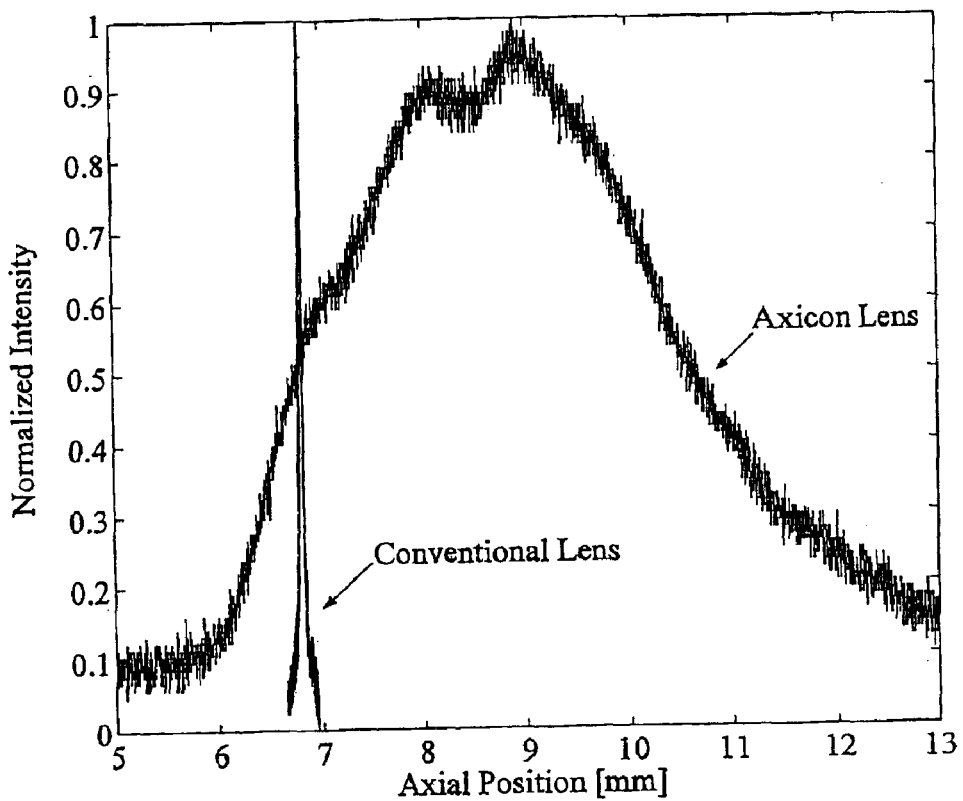
FIG. 3 is a graph showing the signal in the sample arm of the interferometer as a function of axial position for an axicon lens and a conventional lens.

To test our OCT system performance, we first measured the detected signal versus mirror axial position behind the axicon lens 100 by blocking out the reference arm 15 and using a reflecting mirror as the sample, and then compared the results as shown in FIG. 3. For comparison, signal versus axial position of a conventional lens (f=10 mm, NA=0.35, WD-6.8 mm) replacing the axicon lens 100 shown in FIG. 2 is also measured. The result clearly demonstrates that the axicon lens 100 has a much greater focusing range than the conventional lens. The focusing range is approximately 7 mm (fun width at l/e.2), which is smaller than the theoretical value of 12 mm. The reason for the reduced focusing range is that the spherical geometrical shape of the axicon apex acts as an equivalent lens and focuses the central part of the illuminating light to a point away from the axicon apex. Because focal energy using an axicon lens 100 is distributed along the focusing ranging, the power at each focusing point using an axicon lens 100 is smaller than that using a conventional focusing lens. In FIG. 3, the detected peak signal ratio between the conventional and axicon lenses 100 is about 16. There is a compromise between signal intensity and focusing range. However, our current system using an over the counter axicon lens 100 has a focusing range of more than 6 mm. If an axicon lens 100 designed specifically for OCT is made with a focusing range of 2 mm, the difference in peak intensity between the axicon and conventional lenses will be reduced.

Figure 4:
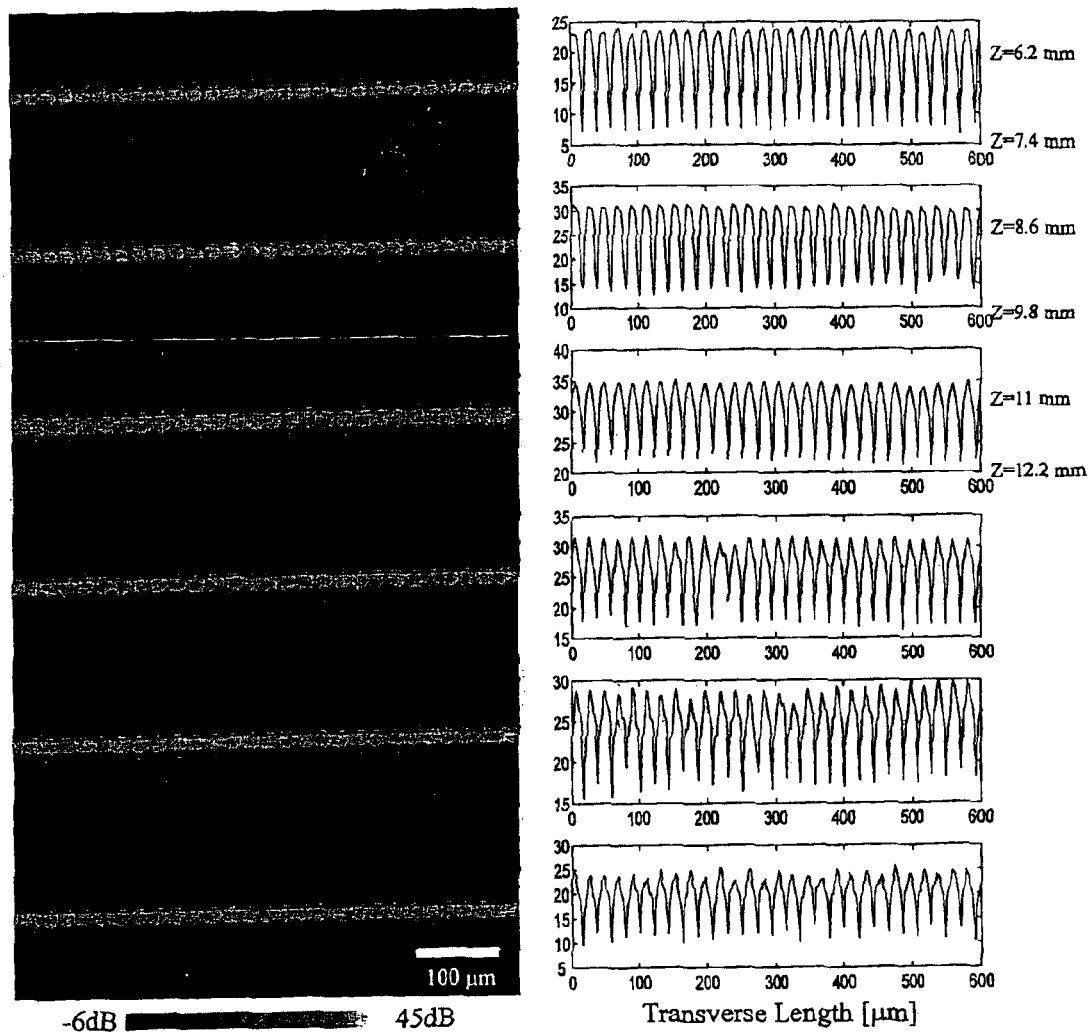
FIG. 4 shows a series of OCT images and their corresponding cross-sectional profiles normal to the bar direction (noise floor is about −6 dB). Successive images from top to bottom correspond to the target located at different axial positions relative to the axicon apex with an interval of 1.2 mm over a total observed depth of 6 mm.

The focusing range and lateral resolution of the axicon lens based OCT system was calibrated with a variable frequency resolution target from Edmund Scientific (Barrington, N.J.). Sequences of OCT images were made with the target located at different axial positions. The density of the parallel bar to be imaged is 50 line pairs per mm, which corresponds to a spatial resolution of 10 μm. FIG. 4 shows the OCT images and their corresponding cross-sectional profiles for the target located at different axial positions relative to the axicon apex with an interval of 1.2 mm over a total observed depth of 6 mm. The OCT image size is 600 μm by 200 μm. These results confirm a focusing depth range of at least 6 mm with 10 μm or better lateral resolution. In contrast, the Rayleigh range for a $TEM_{00}$ Gaussian beam with a 10 μm waist radius at a wavelength of 1.3 μm is less than 0.25 mm.

Figure 5:
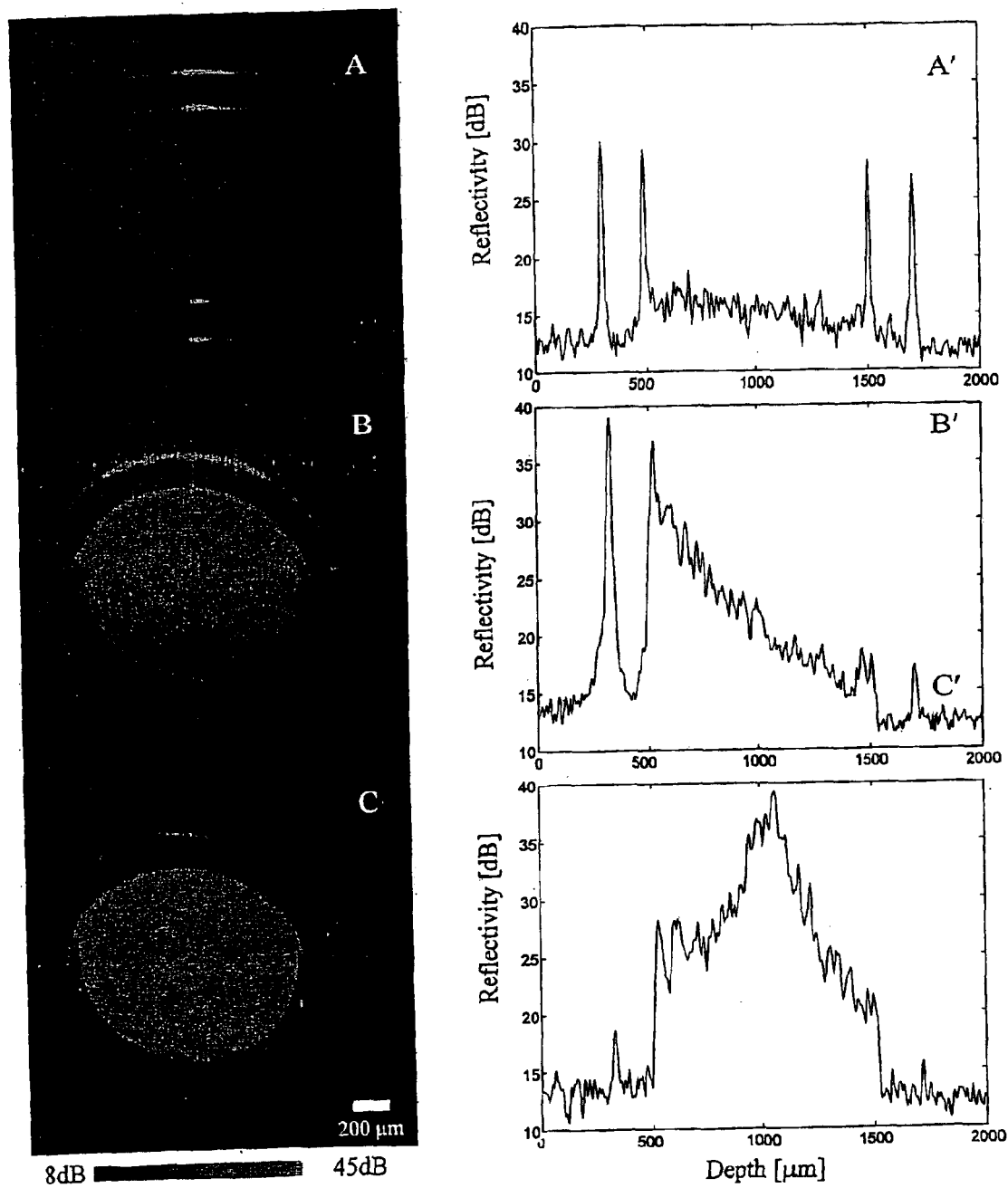
FIGS. 5A–5C and 5A'–5C' shows a series of OCT images of a capillary tube with polystyrene microspheres and their profiles along the center of the tube in the depth direction corresponding to different focusing conditions in the sample arm.

To confirm the feasibility of the axicon lens based OCT system, images were taken of the same sample with both axicon and conventional lenses. The sample is polystyrene microspheres (diameter=0.356 μm) inside a capillary tube immersed in water. The internal diameter of the tube was 1.1 mm and the wall thickness was 0.20 mm. The 2.7% polystyrene microsphere solution was diluted with distilled water using a 1 to 10 volume ratio (scattering coefficient calculated to be 4.8 $cm^{-1}$). An OCT image using an axicon lens is shown in FIG. 5A where both the lumen and tube wall can be observed; image size is 2 mm by 2 mm. An OCT signal as a function of depth plotted across the center of the lumen is shown in the graph of FIG. 5A'. Although a slow decay in the signal is observed as a function of depth, this decay is mainly due to scattering attenuation by the microspheres. For comparison, OCT images using a conventional lens for different focusing positions in the lumen are shown in FIGS. 5B and 5C. The bright region corresponds to the focusing depth of the lens. Plots of the corresponding signals as a function of depth (FIGS. 5B' and 5C') when compared to FIG. 5A', clearly indicate that the signals are strongly dependent on the focusing locations of the lens. The OCT signal decays much faster further away from the focusing location. Thus, in addition to high lateral resolution over a greater depth range, the OCT signal is more uniform over the depth range when using an axicon lens 100.

In conclusion, we have achieved 10 μm or better lateral resolution over a focusing depth of at least 6 mm using an axicon lens 100 with a top angle of 160 degrees in our OCT system. These results demonstrate that an axicon lens 100 can be used in an OCT system to maintain high lateral resolution over a greater depth of field, which is essential for high resolution, high-speed OCT.

In conventional imaging systems where axicon has previously been used, one only has to consider the energy distribution. In optical coherence tomography, in addition to the energy, on also have to consider the optical path length. Only optical path lengths that are matched within the coherence length will contribute to the image formation. Before our experiment, it is not clear how axicon lens would perform in the OCT system.

In addition, axicon technique produces a relatively high level side lobe, which is undesirable for conventional image. However, in OCT the side lobe contribution to the degradation of lateral resolution is minimized. This is because, in addition to the confocal spatial filtering geometry that reduces the contribution from the side lobes, photons backscattered from central core and side lobes has different optical path length, the phase discrimination capability of OCT will significantly reduce the contribution of the side lope to the image degradation.

Furthermore, in many functional OCT (Doppler, birefringence, spectroscopic, phase dispersion etc.) and endoscopic OCT, it is difficult to implement dynamic focus tracking, and the axicon lens is essential in the functional and endoscopic OCT system to achieve high resolution over a large depth.

Finally, implementation of an axicon lens provides a more uniform illumination along the depth, which assures a more uniform signal with less dynamic variation range. Signal with less dynamic range favors the accuracy of data processing, this is particularly important in functional OCT, where signal uniformity is important in the quality of imaging reconstruction.

Figure 6A:
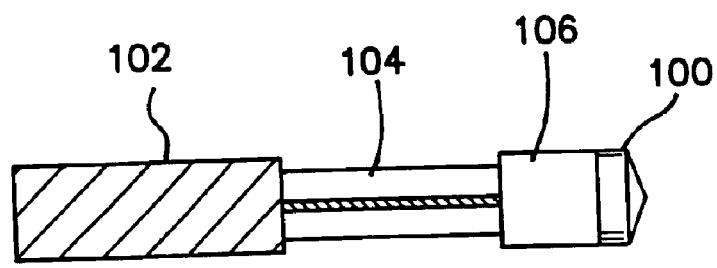
FIGS. 6a–6d are simplified side views of several embodiments of the invention using an axicon lens as the terminating element in an endoscopic probe.
Figure 6B:
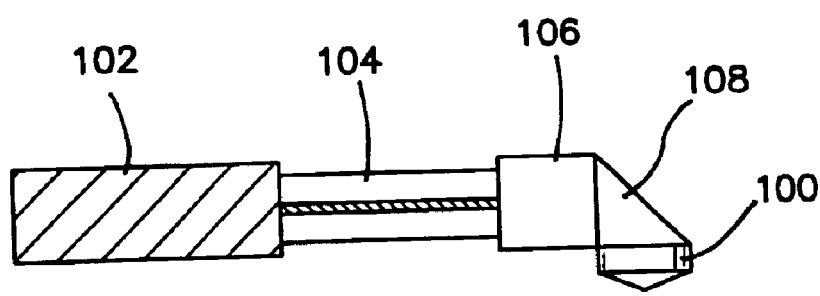
Figure 6C:
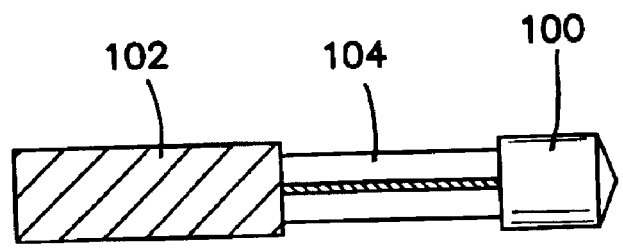
Figure 6D:
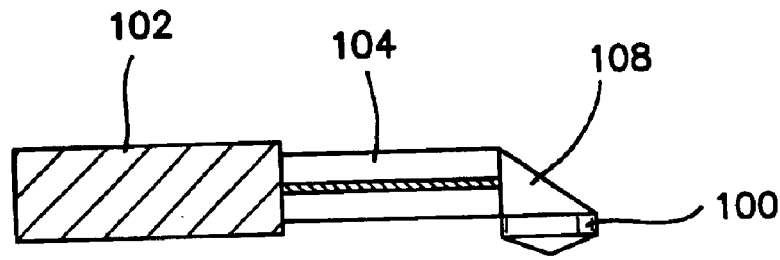

In addition to the conventional probe, the axicon lens can also be used in high resolution endoscopic (and/or catheter) OCT system. This is especially important because dynamic focusing is not possible in endoscopic (and/or catheter) OCT. High resolution is especially important for cancer diagnosis in the gastrointestinal (GI), respiratory, and urogenital tracts. It is also important in diagnosis of the cardiovascular disease. FIGS. 6a–6d show endoscopic probe designs for both forward and sideward endoscopic probes using an axicon lens 100. FIGS. 6a–6d each show a buffer jacket 102 disposed over a stripped optical fiber 104. FIG. 6a has a graded index lens (GRIN) coupled to the distal end of fiber 104, which is then in turn coupled to axicon lens 100. FIG. 6b has the same elements but includes a prism 108 between GRIN lens 106 and axicon lens 100 to provide for a sideward endoscopic probe. FIG. 6c couples fiber 104 directly to axicon lens 100. FIG. 6d includes a prism 108 between fiber 104 and axicon lens 100.

Owing to coherence gating, which is intrinsic to OCT, OCT imaging offers the depth discrimination capability, and high axial resolution can still be achieved despite of the long focal depth provided by axicon lens in the sample arm. However, coherence gating usually provides no lateral discrimination due to the existence of a co-phasal plane in its transverse direction. The lateral resolution is only dependent upon the beam focusing condition as for conventional optical microscopy. Therefore, side lobes accompanying the beam within the sample will lower the image contrast and increase the effective sampling volume.

Figure 7:
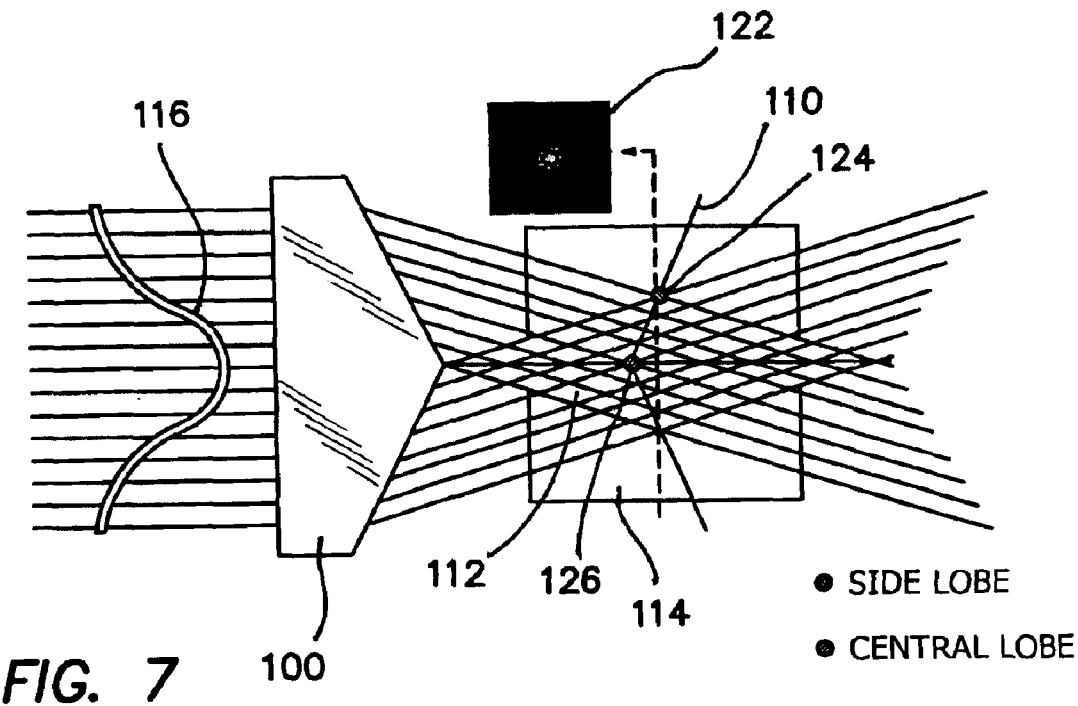
FIG. 7 is a diagrammatic depiction of the cophasal plane and transverse distribution of a beam produced by an axicon lens under Gaussian illumination.

An axicon lens produces a beam with relatively higher side lobes than a conventional lens and is undesirable in non-coherence imagery, but the situation is somewhat different when applied to OCT imaging. Assuming a single scattering model of the interaction between light and scatterers within a sample 114, the phase discrimination capability of OCT will ensure the selection of photons only from scatterers located at the co-phasal plane as depicted in FIG. 7. The conical co-phasal plane 112 produced by axicon lens 100 along with a coherence gating (not shown) provides intrinsic attenuation of the side lobes of the beam, because coherently selected photons scattered from an area of sample 114 associated with the side lobes must travel a longer path within the sample 114 than those from an area associated with its central lobe 116 in the same co-phasal plane 110.

Although the coherence gating intrinsic to OCT in combination with the conical co-phasal plane 112 intrinsic to an axicon lens 100 will attenuate the contribution from scatterers located in an area associated with side lobes relative to its central lobe in the same co-phasal plane 112 further reduction of the effect of the side lobes on image contrast should be taken in order to improve use of an axicon lens 100 in practical applications.

Figure 8:
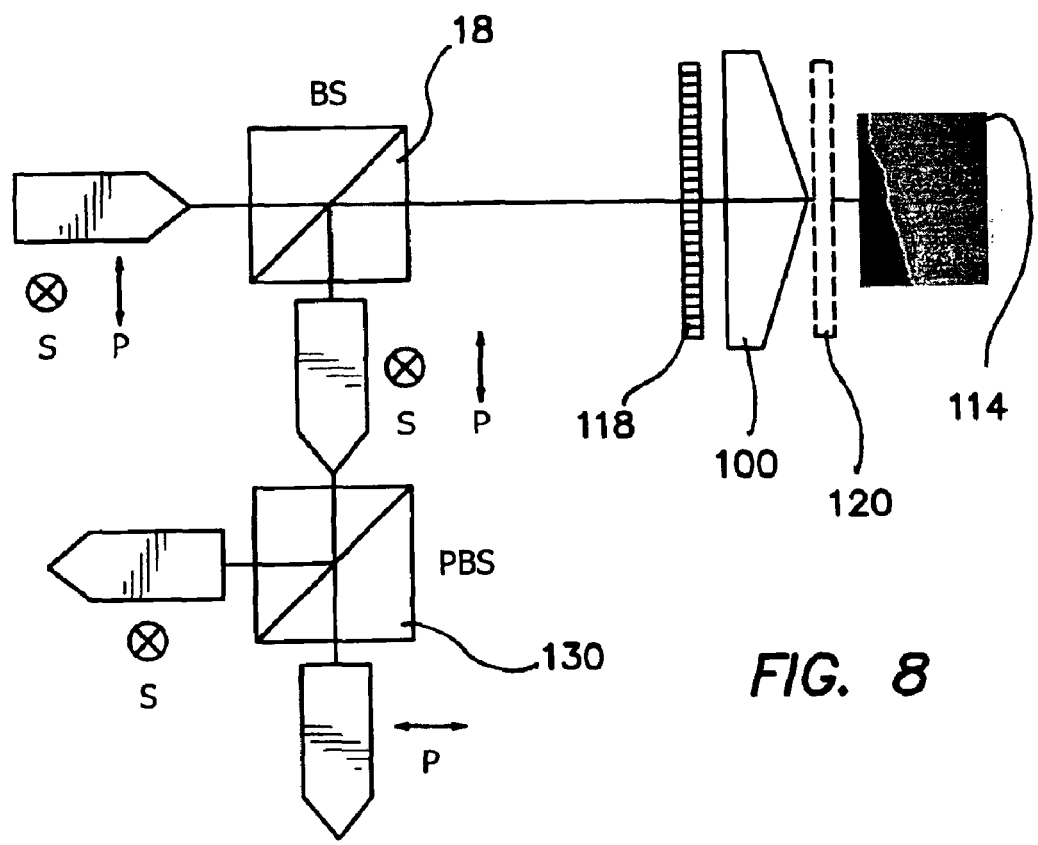
FIG. 8 is a diagrammatic schematic of the illumination and collection system in the sample arm and orthogonal channels for simultaneous signal detection.

Here we take advantage of the polarization property of light in combination with a polarization-sensitive spatial filter to suppress side lobes as diagrammatically depicted in FIG. 8. FIG. 8 illustrates the co-phasal plane 112 and transverse distribution of a beam produced by axicon lens 100 under Gaussian illumination. Typical side lobe and central lobe of the realized beam are shown in the inset 122 in plan view based on geometrical optics. The photon traveling length within the sample 114 of a photon backscattered from an area associated with the side lobes and the central lobe at the same cophasal plane 110 is different as indicated by the bend in the co-phasal plane 110 at point 126 for the central beam or lobe and point 124 for a side lobe, also lying on the co-phasal plane 110. Nematic liquid crystals are optically equivalent to a linear waveplate whose optical axis is fixed, while its birefringence is a function of the applied voltage. As the applied voltage varies, the optical path length for a linearly polarized beam propagating parallel to the extraordinary axis will change, but the optical path length for a linearly polarized beam propagating perpendicular to the extraordinary axis keeps constant. Therefore, using nematic liquid crystal array we can generate a duplex functional component that acts as a spatial filter for extraordinary light and as a homogeneous transmitter for ordinary light. Ignoring the depolarization effects resulting from the interaction of light with sample 114, we have two alternative combinations of a filter 118 and axicon lens 100 that could be implemented in the sample arm for effective side lobe reduction while keeping high lateral resolution over a large depth range.

Figure 10A:
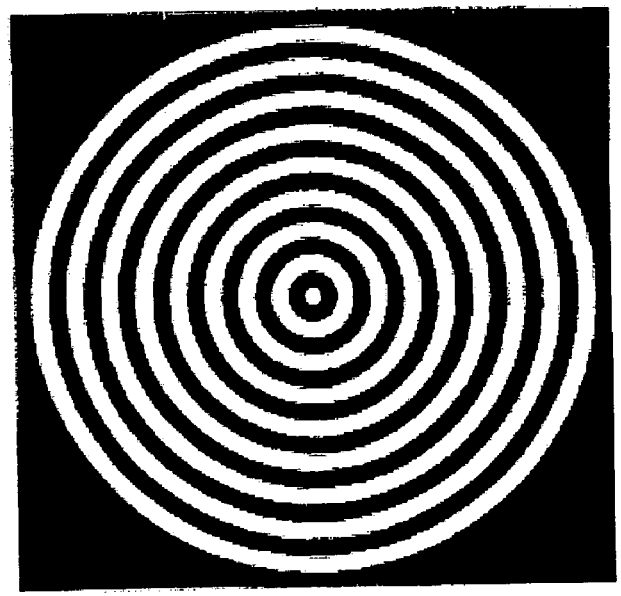
FIGS. 10a and 10b are the $J_0$ and $J_1$ Bessel patterns respectively of a masked array used as a spatially distributed phase filter or second axicon lens in FIG. 8.
Figure 10B:
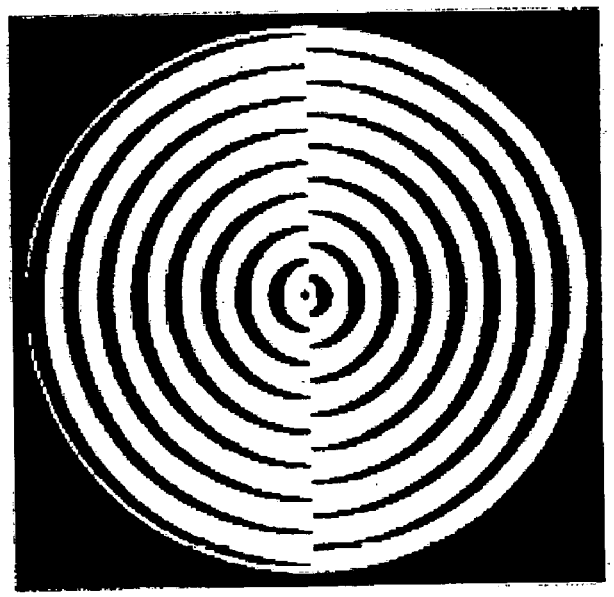

Filter 118 is a phase masked array which can be patterned to provide selective spatial filtering. For example, using the holographic techniques described in Vasara et al., *"Realization Of General Nondiffracting Beams With Computer-Generated Holograms,"* J. Opt. Soc. Am. A/Vol. 6, No. 11/November 1989 a Bessel $J_0$ and a Bessel $J_1$ pattern shown in FIGS. 10*a* and 10*b* respectively can be impressed into filter 118, which performs as a phase filter. The side lobes of the Bessel $J_0$ and a Bessel $J_1$ patterns are spatially offset from one another while the main beam or zeroth lobe is coincident.

Figure 9A:
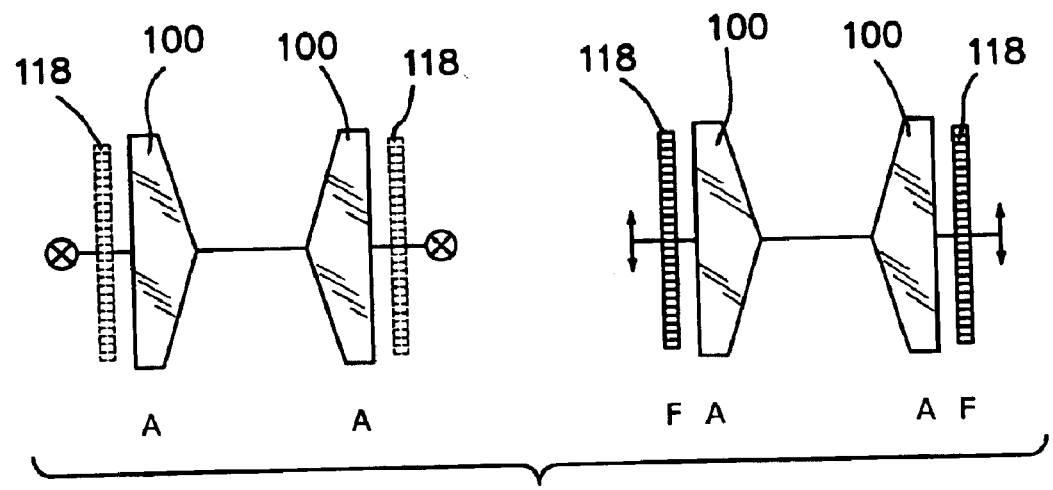
FIGS. 9a and 9b are schematic diagrams of an unfolded filter and axicon combination in orthogonal channels.

First, as depicted in the unfolded illumination and collection embodiment as diagrammatically shown in FIG. 9*a*, where conceptually there are two axicon lenses 100 and light is transmitted from right to left in the figure through both lenses 100, two orthogonal light signals, called an S-channel and P-channel, are collected simultaneously based on polarization discrimination and then subtracted for side lobe reduction. The filter 118 in FIG. 9*a* is so designed that in combination with axicon lens 100, it produces a beam with a dramatically reduced central lobe, while its sidelobes and depth range are closely matched to the beam produced by the axicon lens 100 only. The duplex functional component acting as a spatial filter is shown in solid outline in FIGS. 9*a* and 9*b*, while when acting as a homongenous transmitter it is shown in solid outline in FIGS. 9*a* and 9*b*. When the light polarization is out of the plane of the figure it is transmitted through lenses 100 and filters 118 as shown in the left half of FIG. 9*a*, and when the light polarization is in the plane of the figure it is transmitted through lenses 100 and filters 118 as shown in the right half of FIG. 9*a*.

Figure 9B:
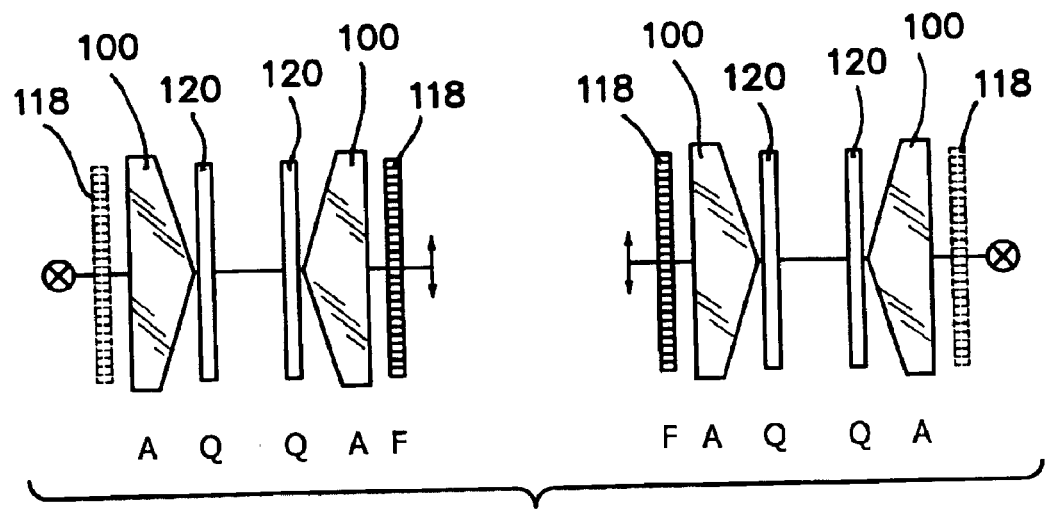

Second, as shown in FIG. 9*b*, when two quarter wave plates 120 (oriented at 45°) are placed immediately behind the axicon lenses 100, two orthogonal signals are collected simultaneously and then summed for signal enhancement. When in the left half of FIG. 9*b* the light polarization is out of the plane of the figure it is transmitted through left lens 100, rotated 45° by left filter 118, rotated again 45° by right filter 118 and passes through right lens 100 and filter 118 to result in a polarization in the plane of the figure. When the light polarization is in the plane of the figure as shown in the right half of FIG. 9*b*, it is transmitted through left lens 100, rotated 45° by left filter 118, rotated again 45° by right filter 118, and passes through right lens 100 and filter 118 to result in a polarization out of the plane of the figure. The filters in FIG. 9*b* are so designed that in combination with axicon lens 100 a beam is produced with less or no sidelobes, but a comparable depth range to the beam produced by axicon lens 100 only.

Thus, in the first embodiment, the sidelobe reduction is based on subtraction while in the second embodiment, the sidelobe reduction is dependant on multiplication of two point-spread functions. In the illustrated embodiment filter 118 has been described as a pure phase or phase-only filter. However, it is to be expressly understood that an amplitude-only filter 118 or a combined amplitude and phase filter 118 can be simularly provided to reduce the side lope effect.

Return to FIG. 8, which is a folded version of the situations of FIGS. 9*a* and 9*b*. Orthogonally polarized light components are transmitted through a beam splitter 128 to a nematic liquid crystal filter 118, which is a pure phase filter for horizontally polarized light as described above. In the first pass of the light through filter 118 there is no phase change of the light because the polarization is parallel to the ordinary axis. The light is then focused by axicon lens 100 in a $J_0$ Bessel pattern, for example, and the polarization is rotated 45° by a quarter wave plate 120 before impinging on sample 114. Scattered light from sample 114 returns through quarter wave plate 120, is rotated again by 45° for a total of 90°, and passes through lens 100 and filter 118, which is configured in a $J_1$ Bessel pattern, for example, and then proceeds to beam splitter 128. Because of the polarization rotatation by quarter wave plate 120, filter 118 is now "turned on" or is effective to phase filter the light, but it phase filters only where the sidelobes of the $J_0$ and $J_1$ patterns overlap. The central lobe is not phase filtered, which is an artifact of the spatially distributed phase filtering pattern established in both axicon lens 100 and filter 118. The phase filtering can be adjusted so that there is destructive interference or convolution pattern when recombined with the original signal when combined in beam splitter 128. The reverse configuration of polarization also results in analogous optical signal processing so that either polarization may be initially chosen, i.e. either S-channel or P-channel signals. The S-channel and P-channel signals are reflected into polarization beam splitter 130 where the signals are separated for detection.

It should be mentioned that the side lobes of the produced beam by the proposed axicon lens 100 will not generate a problem in OCT modalities based on nonlinear effects, such as anti-Stokes Raman scattering spectroscopic OCT. Nonlinear OCT imaging has inherent sidelobe reduction capability.

The noninvasive nature and exceptionally high spatial resolution OCT with axicon lens have distinct applications in the clinical management of patients:

Cancer diagnosis in the gastrointestinal (GI), respiratory, and urogenital tracts (including larynx, bladder, uterine cervix etc.).

Cancer diagnosis in skin

Diagnosis of cardiovascular disease

Provide an in situ three-dimensional tomographic image and velocity profiles of blood perfusion in human skin at discrete spatial locations in either the superficial or deep dermis;

Burn depth determination; provide guidance regarding the optimal depth for burn debridement prior to definitive closure;

Determination of tissue perfusion and viability immediately after injury, wound closure, replantation, or transposition of either rotational or free skin flaps;

Potential to evaluate the vascular status of a buried muscle flap covered by a split thickness skin graft; perfusion in the superficial and deeper flap components can be monitored separately;

Distinguish between arterial or venous occlusion and determine the presence and/or extent of adjacent post-traumatic arterial or venous vascular injury by providing in situ tomographic image and velocity profile of blood flow;

Monitor the effects of pharmacological intervention on skin microcirculation (e.g., effects of vasoactive compounds or inflammatory mediators; determination of transcutaneous drug penetration kinetics; evaluation of the potency of penetration enhancers; irritation of chemical compounds, patch-test allergens and ultraviolet radiation; comparison of the reactivity of the skin microcirculation in different age and ethnic groups); and Determine the extent of intestinal vascular insufficiency or infarction; to conserve intestine by confining resection to nonvascularized segments.

Measure ocular, blood flow and birefringence, diagnosis of ocular disease.

Image three-dimensional tumor microvasculature for angiogenesis research;

Optimize radiation dosimetry by assessing and quantifying alterations in tissue microvascular and matrix structure;

Determine long-term alterations in microvascular haemodynamics and morphology in chronic diseases such as diabetes mellitus and arteriosclerosis;

Map cortical hemodynamics with high spatial resolution for brain research;

Surgical guidance for brain surgery

Finally, phase resolved OCT/ODT with axicon lens is also attractive for the following industrial applications:

Image flow dynamics in microchannels of micro-electromechanic system (MEMS) chip.

Characterization and monitoring of flow velocity when the fluid is encapsulated in highly scattering materials such as fibrous substances or resin composites;

Particle concentration and size, and fluid flow velocity profile may be accurately measured and provide useful diagnostic information for process monitoring and quality control;

Situations involving turbid fluid flow samples such as materials processing of paints, pigmented fluids, and other types of opaque liquids; and Characterization and monitoring of dry particulate flow within conduits such as a jet stream; here, a significant advantage of ODT is that the flow could be characterized and monitored without disturbing the stream.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. An improvement in a scanning optical coherence tomographic (OCT) system, which includes an interferometer with a sample arm for scanning a sample, the improvement comprises an axicon lens disposed in the sample arm to simultaneously achieve high lateral resolution and a greater depth of focus of the sample, the axicon lens in the sample arm being provided with spatially coherent light where the axicon lens comprises a phase masked array.

2. An improvement in an apparatus for phase-resolved optical tomography in which the apparatus comprises an interferometer; a source of at least partially coherent radiation through coupled to the interferometer in which the at least partially coherent radiation is characterized by a phase; a phase modulator coupled to the source to modulate the radiation in the interferometer at a modulation frequency; and a scanner for scanning the sample with the source of at least partially coherent radiation through the interferometer in a sequence of pixel line scans, the sample has a fluid flow therein so that the phase of the partially coherent radiation is changed in response to the fluid flow at each pixel of each pixel line scan, a detector detects interference fringes of the radiation backscattered from the sample into the interferometer, a processor determines the corresponding phase at each pixel of the pixel line scans from the phase signals of the detected backscattered interference fringes and compares the phase between corresponding pixels in two line scans to generate a difference between the phase at the two corresponding pixels in two line scans, a display generates a tomographic image of the fluid flow in the sample from the difference at each pixel, the improvement comprises an axicon lens disposed in the sample arm to simultaneously achieve high lateral resolution and a greater depth of focus of the sample.

3. A method for phase-resolved optical tomography comprising: providing a source of at least partially coherent radiation through an interferometer, the at least partially coherent radiation characterized by a phase; phase modulating the radiation in the interferometer at a modulation frequency; scanning the sample with the source of at least partially coherent radiation through the interferometer in a sequence of pixel line scans using an axicon lens to simultaneously achieve high lateral resolution and a greater depth of focus of the sample, the sample having a fluid flow therein; changing the phase of the at least partially coherent radiation in response to the fluid flow at each pixel of each pixel line scan; detecting interference fringes of the radiation backscattered from the sample into the interferometer through the axicon lens; processing the detected interference fringes to determine phase signals of the detected backscattered interference fringes at each pixel of the pixel line scans to determine the corresponding phase at each pixel in a data window; comparing the phase between corresponding pixels in two line scans to generate a difference between the phase at the two corresponding pixels in two line scans whereby speckle is substantially reduced; and generating a tomographic image of the fluid flow in the sample from the phase difference at each pixel.

4. A method for phase-resolved optical tomography comprising: providing a source of at least partially coherent radiation through an interferometer, the at least partially coherent radiation characterized by a phase; phase modulating the radiation in the interferometer at a modulation frequency; scanning the sample with the source of at least partially coherent radiation through the interferometer in a sequence of pixel line scans using an axicon lens to simultaneously achieve high lateral resolution and a greater depth of focus of the sample, the sample having fluid flow therein; changing the phase of the at least partially coherent radiation in response to the fluid flow at each pixel of each pixel line scan; detecting interference fringes of the radiation backscattered from the sample into the interferometer through the axicon lens; processing the detected interference fringes to determine phase signals of the detected backscattered interference fringes at each pixel of the pixel line scans to determine the corresponding phase at each pixel in a data window; comparing the phase between corresponding pixels in two line scans to generate a difference between the phase at the two corresponding pixels in two line scans whereby speckle is substantially reduced; and generating a tomographic image of the fluid flow in the sample from the phase difference at each pixel, performing the foregoing steps to achieve one of the following: to diagnose cancer in the gastrointestinal (GI), respiratory, and urogenital tracts including larynx, bladder, uterine and cervix cancers; to diagnose cancer in skin; to diagnose cardiovascular disease; to provide an in situ three-dimensional tomographic image and velocity profiles of blood perfusion in human skin at discrete spatial locations in either the superficial or deep dermis; to determine burn depth in skin; to provide guidance regarding the optimal depth for burn debridement prior to definitive closure; to determine tissue perfusion and viability immediately after injury, wound closure, replantation, or transposition of either rotational or free skin flaps; to evaluate the vascular status of a buried muscle flap covered by a split thickness skin graft; to separately monitor perfusion in the superficial and deeper flap components; to distinguish between arterial or venous occlusion; to determine the presence and/or extent of adjacent post-traumatic arterial or venous vascular injury by providing in situ tomographic image and velocity profile of blood flow; to monitor the effects of pharmacological intervention on skin microcirculation including the effects of vasoactive compounds or inflammatory mediators; to determine transcutaneous drug penetration kinetics; to evaluate the potency of penetration enhancers; to determine the irritation caused by chemical compounds, by patch-test allergens and by ultraviolet radiation; to compare the reactivity of the skin microcirculation in different age and ethnic groups; to determine the extent of intestinal vascular insufficiency or infarction; to conserve intestine by confining resection to nonvascularized segments; to measure ocular, blood flow and birefringence for diagnosis of ocular disease; to image three-dimensional tumor microvasculature; to optimize radiation dosimetry by assessing and quantifying alterations in tissue microvascular and matrix structure; to determine long-term alterations in microvascular haemodynamics and morphology in chronic diseases such as diabetes mellitus and arteriosclerosis; to map cortical hemodynamics with high spatial resolution for brain research; to provide surgical guidance for brain surgery; to image flow dynamics in microchannels of micro-electro-mechanic system (MEMS) chips; to characterize and monitor of flow velocity when the fluid is encapsulated in highly scattering materials such as fibrous substances or resin composites; to accurately measure particle concentration and size, and fluid flow velocity profile; to provide useful diagnostic information for process monitoring and quality control; to provide measurements involving turbid fluid flow samples such as materials processing of paints, pigmented fluids, and other types of opaque liquids; or to characterize and monitor dry particulate flow within conduits such as a jet stream.

5. An improvement in a scanning optical coherence tomography (OCT) system, which includes an interferometer with a sample arm for scanning a sample, the improvement comprises an axicon lens disposed in the sample arm to simultaneously achieve high lateral resolution and a greater depth of focus of the sample, the axicon lens in the sample arm being provided with spatially coherent light, a spatially distributed filter and a quarterwave plate in optical combination with the axicon lens, the spatially distributed phase filter having a spatiall patterned defined therein to reduce sidelobe components of the spatially coherent light.

6. The improvement of claim 5 where the spatially distributed filter, quarterwave plate and axicon lens combine to reduce sidelobe components of the spatially coherent light by subtraction.

7. The improvement of claim 5 where the spatially distially distributed filter, quarterwave plate and axicon lens combine to reduce sidelobe components of the spatially coherent light by multiplication of two point-spread fuctions.

8. The improvement of claim 5 where the spatially distributed filter is comprised of a pure phase filter.

9. The improvement of claim 5 where the spatially distributed filter is comprised of an amplitude and phase filter.

* * * * *